(12) United States Patent
Scofield et al.

(10) Patent No.: US 8,416,073 B1
(45) Date of Patent: *Apr. 9, 2013

(54) LOCATION AWARE REMINDERS

(75) Inventors: Christopher L. Scofield, Seattle, WA (US); Luan K. Nguyen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,706

(22) Filed: Oct. 27, 2011

Related U.S. Application Data

(63) Continuation of application No. 12/330,220, filed on Dec. 8, 2008, now Pat. No. 8,054,180.

(51) Int. Cl.
*G08B 1/08* (2006.01)
(52) U.S. Cl. ............ 340/539.13; 340/539.1; 340/539.11; 340/539.23
(58) Field of Classification Search ............... 340/539.1, 340/539.11, 539.13, 539.23
See application file for complete search history.

(56) References Cited

U.S. PATENT DOCUMENTS

| | | | |
|---|---|---|---|
| 6,123,259 A | 9/2000 | Ogasawara | |
| 6,368,450 B2 | 4/2002 | Hayashi | |
| 8,054,180 B1 * | 11/2011 | Scofield et al. | 340/539.13 |
| 8,060,582 B2 | 11/2011 | Bliss et al. | |
| 2002/0178013 A1 | 11/2002 | Hoffman et al. | |
| 2003/0208409 A1 | 11/2003 | Mault | |
| 2006/0089792 A1 * | 4/2006 | Manber et al. | 701/207 |
| 2006/0247973 A1 | 11/2006 | Mueller et al. | |
| 2008/0010121 A1 | 1/2008 | McIntosh | |
| 2008/0036612 A1 | 2/2008 | Koslow et al. | |

OTHER PUBLICATIONS

U.S. Appl. No. 12/330,220 entitled "Location Aware Reminders," which was filed on Dec. 8, 2008.

* cited by examiner

*Primary Examiner* — Daryl Pope
(74) *Attorney, Agent, or Firm* — Thomas Horstemeyer, LLP

(57) ABSTRACT

Disclosed are various embodiments employed to generate location and proximity based reminders. To this end, a device is configured to generate its geographical location using a positioning system. The device detects when it impinges upon at least one geographical trigger based upon its geographical location. A predefined reminder is generated in the device when the device impinges upon the geographical trigger.

28 Claims, 8 Drawing Sheets

PROXIMITY BASED REMINDERS

Enter New Name/Select Existing Person:

| John Harris ▽ | Create List |

⎣—303

Enter/Select Identifier:

| (123) 456-7890 ▽ | Browse |

⎣—306

Give me a reminder when:

☒ We are both located at the same establishment

| Specify Location(s) on Map |—309

☒ Whenever we are within [ 15 Feet ▽ ] of each other.

⎣—313

Enter Reminder Message: —316

| Pay John 5 bucks for lunch last week. |

Specify Time Range(s):

Start Time: [ 12:00 PM ▽ ]   Days: [ 03/17/08 ▽ ]

End Time: [ 1:00 PM ▽ ]   [ Select on Calendar ]

—226

Actions to Take:

○ Send email to: [                    ]

⎣—319

—233
[ Accept/Done ]

LOCATION AWARE REMINDERS

CROSS REFERENCE TO RELATED APPLICATION

This application is a continuation of and claims priority to co-pending U.S. patent application Ser. No. 12/330,220 filed Dec. 8, 2008, which is incorporated herein by reference in its entirety

BACKGROUND

Current calendar applications for computers and mobile devices provide an ability to schedule appointments at preset times and generate reminders in advance of meetings and the like. However, such applications only provide reminders based upon pre-scheduled times.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 4A-4F are drawings depicting examples of user interfaces rendered, for example, on a display device of a client in the networked environment of FIG. 1 according to an embodiment of the present disclosure.

DETAILED DESCRIPTION

Figure 1:
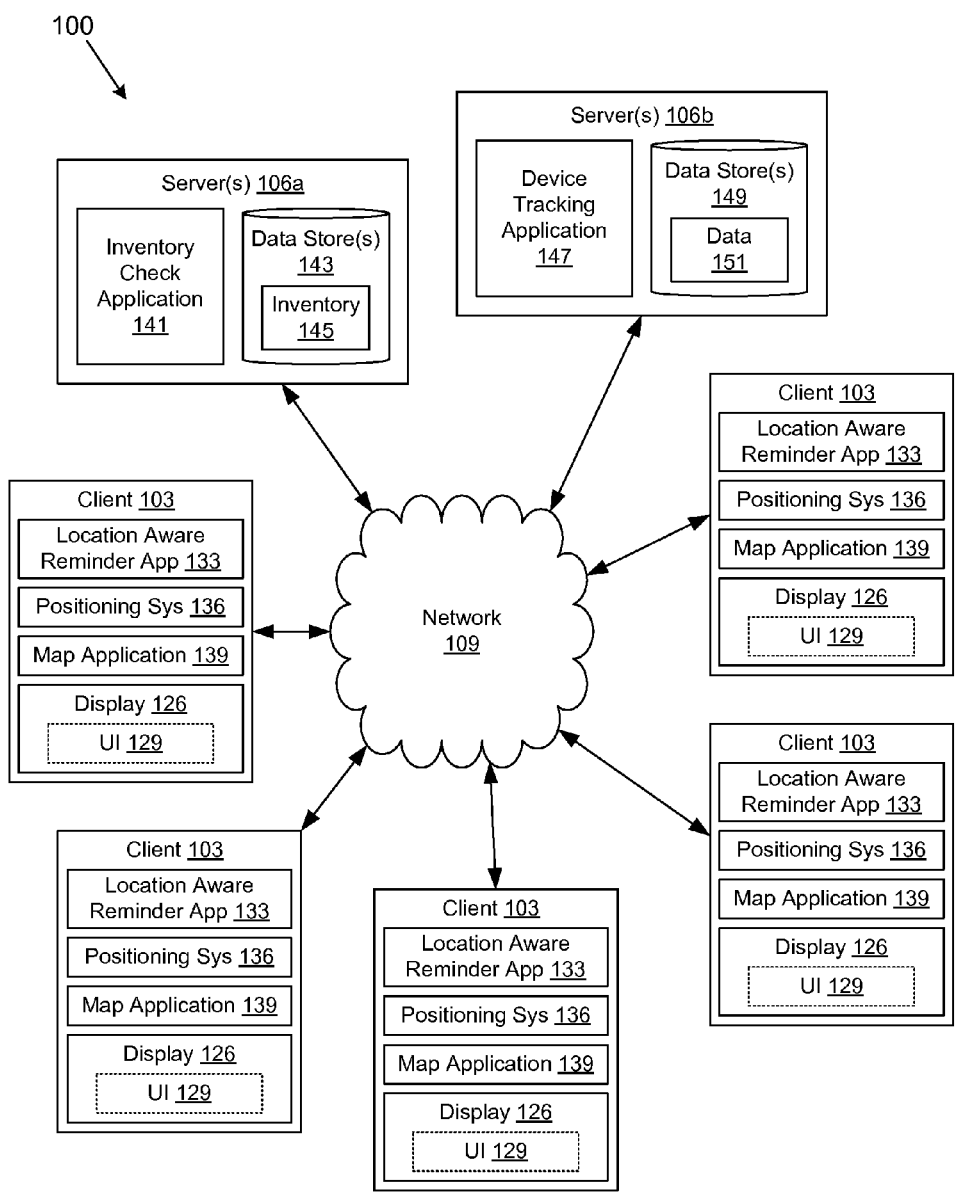
FIG. 1 is a drawing of a networked environment according to an embodiment of the present disclosure.

With reference to FIG. 1, shown is a networked environment 100 that facilitates the use of location aware devices. Specifically, the networked environment 100 includes various clients 103 that have various applications to generate reminders for users based upon the location of the clients 103 as will be described. First, a general description of the physical makeup of the networked environment 100 and its components is described, followed by a discussion of the operation of the same.

To begin, the networked environment 100 includes a number of clients 103 and one or more servers 106 that are each coupled to a network 109. The network 109 may comprise, for example, the Internet, intranets, extranets, wide area networks (WANs), local area networks (LANs), wired networks, wireless networks (such as cellular networks), or other suitable networks, etc., or any combination of two or more such networks.

Each of the clients 103 may comprise, for example, a portable computing system such as, for example, a laptop, personal digital assistant, cellular telephone, or other device that generally is portable such that an individual may carry such device from place to place as can be appreciated. To this end, according to one embodiment, each of the clients 103 includes a processor circuit having a processor and a memory as can be appreciated.

According to one embodiment, each of the clients 103 includes a display device 126 such as, for example, liquid crystal display (LCD) screens, gas plasma-based flat panel displays, or other types of display devices, etc. The display device 126 included within the client 103 facilitates the generation of one or more user interfaces 129 based upon the operation of various applications in the client 103 as will be described. In addition, each of the clients 103 includes various input and output devices such as pushbuttons, speakers, microphones, and other devices as can be appreciated.

In addition, the client 103 includes various applications and/or systems such as, for example, a location aware reminder application 133, a positioning system 136, a map application 139, and other applications and/or systems. The location aware reminder application 133 is an application that generates reminders based upon a location of the client 103 or based on the relative position of the client 103 and other clients 103. In addition, the reminders may be generated based on other criteria as will be described.

The positioning system 136 is configured to generate a position of the client 103. To this end, the positioning system 136 may comprise a global positioning system (GPS) that can determine a position of the client 103 based upon satellite signals as can be appreciated. Alternatively, the positioning system 136 may determine the location of the client 103 based upon signals from cellular towers, or other signals as can be appreciated. Where the positioning system 136 comprises GPS, the positioning system 136 may be embodied in an integrated circuit that is included in the client 103 as will be described.

The map application 139 is configured to generate a map of a desired geographical area as can be appreciated. In one embodiment, the map application 139 may generate maps based on map data stored in the client 103. However, where the client 103 memory space is limited, the map application 139 may be configured communicate with a server 106 that generates maps that are downloaded to the client 103 and displayed in a user interface 129 on a display device 126 as will be described.

According to the various embodiments, the location aware reminder application 133 executed within a client 103 provides for the generation of reminders in the respective client 103 when the client 103 impinges upon a geographical trigger. A geographical trigger comprises a feature defined with respect to a geographical location that may be analyzed relative to a position of the client 103 such that it is determined whether a reminder is to be generated as will be described.

To this end, the positioning system 136 generates a geographical location of the client 103 on an ongoing basis. As the client 103 moves from place to place, the location aware reminder application 133 detects whether a client 103 impinges upon one or more geographical triggers defined by a user. When the client 103 impinges upon a geographical trigger, then a predefined reminder is generated in the client 103 as will be described.

The networked environment 100 also includes one or more servers 106, denoted herein as servers 106a and 106b. Each of the servers 106a and 106b may comprise a server computer or like system. The server 106a is employed to make an inventory of a merchant that operates a store or other establishment available on the network 109. To this end, the server 106a includes an inventory check application 141 and a data store 143. The server 106a may include other applications as well.

Stored within the data store 143 is a listing of inventory 145. The inventory check application 141 is configured to receive requests from clients 103 to determine whether various items exist within the inventory 145. To this end, the server 106a may be associated with a given merchant and the inventory 145 may comprise the inventory of such merchant. According to one embodiment, the location aware reminder application 133 may be configured to send a query to the inventory check application 141 to verify whether certain items maintained in a list in the client 103 exist within an inventory 145 as will be described. If the inventory check application 141 confirms that such items exist within the inventory 145, then the inventory check application 141 sends a message back to the client 103 confirming the existence of such items in the inventory 145. In such case, a reminder may be generated, for example, indicating to a user that such items may be purchased at a given location as will be described.

The server 106b includes a device tracking application 147 and a data store 149. Stored within the data store is tracking data 151. The device tracking application 147 is executed on the server 106b in order to track the location of various clients 103. To this end, each of the clients 103 may be configured to communicate with the device tracking application 147 over the network 109 to provide their geographical positions to the server 106b at any given time. The device tracking application 147 may also be configured to respond to queries on the part of clients 103 as to the location of other clients 103 so that a given client 103 may be made aware of the location of other clients 103 for reasons that follow.

Alternatively, it may be the case that clients 103 communicate directly with each other using a peer-to-peer protocol in order to communicate their respective locations to each other. To this end, clients 103 may communicate with each other by way of e-mail, short message service (SMS), or other communications protocols. Each client 103 may broadcast its location to other clients 103 as can be appreciated. To this end, the position of a respective client 103 may be broadcast to other clients 103 repeatedly via direct wireless communication or via the network 109 on a periodic basis as can be appreciated. In this manner, clients 103 may be kept aware of the location of other clients 103.

Figure 2:
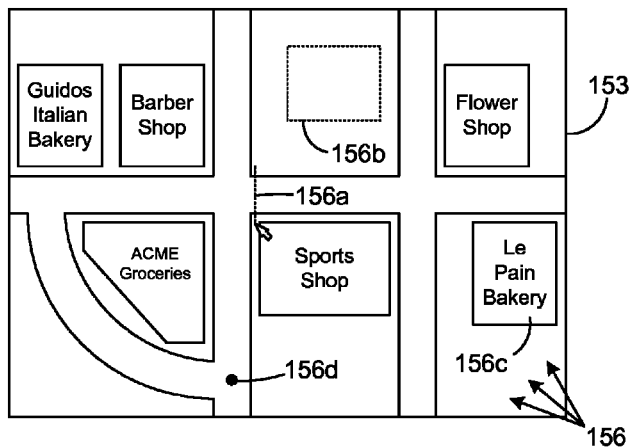
FIG. 2 is a drawing of a map that illustrates geographical triggers employed in clients of the networked environment of FIG. 1 according to an embodiment of the present disclosure.

Referring next to FIG. 2, shown is a map 153 that may be generated as part of a user interface 129 (FIG. 1) on a client 103. The map 153 includes various geographical triggers 156 as will be described. In particular, the geographical triggers 156 may comprise, for example, a trip line 156a, an area 156b, an establishment 156c, a point 156d, or other attribute of the map 153. The trip line 153a is a line drawn at a particular location of the map 153. The location aware reminder application 133 can detect whether the client 103 has impinged upon a trip line 156a when the client 103 detects that the pathway it has traversed runs through the trip line 156a. This may be determined based upon the position of the client 103 generated by the positioning system 136 at any given moment.

In this sense, the trip line 156a is maintained in a memory of the client 103 as two or more geographical points that include the geographical coordinates for each end of the trip line 156a. The location aware reminder application 133 may determine whether the client 103 has passed through the trip line 156a by determining whether the client 103 has traversed a trajectory that passes between the two points at either end of the trip line 156a. Alternatively, the trip line 156a may be represented within the client 103 as a series of points, where the determination as to whether the client 103 has passed through a given trip line 156a is made by determining whether the client 103 has passed between any two of the points that make up the trip line 156a.

A geographical trigger 156 may also comprise a geographical area 156b. Although the geographical area 156b is shown in FIG. 2 as a rectangle, it is understood that the area 156b may comprise any shape as can be appreciated. The geographical area 156b may be defined using any one of a number of different tools as will be described. A client 103 may impinge upon a geographical area 156b, for example, if the client 103 enters the geographical area 156b. Alternatively, the client may impinge upon a geographical area 156b if the client exits the geographical area 156b. To this end, impinging on a given geographical area 156b may involve being located within the defined geographical area 156b, or the area surrounding the geographical area 156b. To this end, it may be the case that the impingement upon a geographical area 156b involves crossing the border of the geographical area 156b.

Another geographical trigger 156 may comprise a known establishment 156c depicted on the map 153. The establishment 156c may comprise, for example, a store, park, building, residence, or other type of establishment 156c that can be marked or otherwise indicated on the map 153. In one embodiment, the establishment 156c comprises a merchant site at which a merchant sells goods such as is the case with stores, etc. The establishment 156c is much like the geographical area 156b described above to the extent that the establishment 156c is defined by an area with a border. However, the establishment 156c may have a known name associated therewith to the extent that an establishment 156c is a store, etc. The client 103 may impinge upon an establishment 156c in much the same way that a client may impinge upon a geographical area 156b described above.

In addition, the geographical trigger 156 may also comprise a single point 156d on the map 153. To this end, a client 103 may impinge upon the point 156d by being positioned within a predefined distance from the point 156d. A radius or other shape around the point 156d may be defined for this purpose.

Figure 3A:
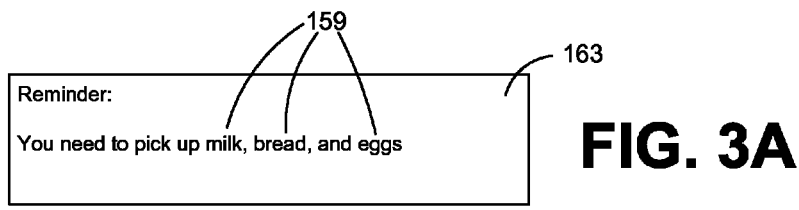
FIGS. 3A-3B are drawings of examples of reminders rendered on a display device of a client device in the networked environment of FIG. 1 according various embodiments of the present disclosure.

Referring next to FIG. 3A, shown is one example of a location based reminder 163 that is generated on the display 126 of a given client 103 (FIG. 1). The location based reminder 163 is generated based upon the location of the client 103. The location based reminder 163 depicted in FIG. 3A reminds a user to purchase certain items 159 such as, for example, as milk, bread, and eggs. Such location based reminders 163 may be generated when the portable client 103 that is carried by a user enters an establishment 156c where it is known that such items 159 may be purchased. A user may be reminded of items 159 they need to purchase whenever they walk into an establishment 156c that sells such items 159. Alternatively, the location aware reminder application 133 may be configured to generate the location based reminders 163 when a user is within a predefined distance of an establishment 156c that potentially sells such items 159.

Still further, the location aware reminder application 133 may include the capability of querying the inventory check application 141 (FIG. 1) in the server 106a (FIG. 1) that can look up the inventory 145 (FIG. 1) of a given establishment 156c to determine whether in fact the items 159 desired are currently being sold by the establishment 156c as will be described. To this end, the location based reminder 163 is location based in that it is generated based upon the current location of the client 103.

Figure 3B:
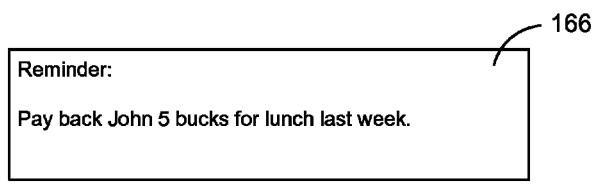

With reference next to FIG. 3B, shown is an example of a proximity based reminder 166 according to another embodiment. The proximity based reminder 166 is generated based upon the proximity of the client 103 to one or more second clients 103 as will be described. A proximity based reminder 166 may also be based on location such as is the case when two clients 103 are in relative proximity to each other at a given establishment 156c (FIG. 2). The proximity based reminder 166 may be generated in a user interface 129 (FIG. 1) of a display 126 (FIG. 1) of a client 103 (FIG. 1) as described above. The proximity based reminder 166 depicted in FIG. 3B is specifically to pay someone back for a loan taken to purchase lunch a week ago. To this end, the proximity based reminder 166 is generated by the client 103 when the location aware reminder application 133 detects that a second client 103 is in a predefined geographical relationship relative to the client 103. The predefined geographical relationship between the respective clients 103 may exist, for example, when the second client 103 is within a predefined distance of the first client 103. This thus allows a user to interact with the third party who holds the second client 103 to pay them back the amount owed in the example cited above. Thus, the proximity based reminder 166 is generated based upon whether a given client 103 is in a predefined geographical relationship relative to a second client 103 as will be described.

Figures 4A, 4B:
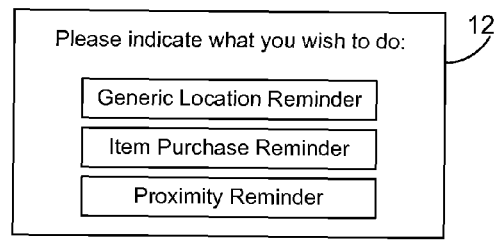

With reference to FIG. 4A, shown is one example of a user interface 129a according to various embodiments. The user interface 129a includes buttons or other components that allow a user to select a desired type of reminder to be created or edited such as a location based reminder 163 (FIG. 3A) or a proximity based reminder 166 (FIG. 3B). To this end, a user may select to edit or create a location based reminder 163 (including item purchase reminders), a proximity based reminder 166, or other types of reminders. Depending upon which button is manipulated, subsequent user interfaces 129 are generated that facilitate the creation and editing of reminders as will be described.

In addition, it should be noted that the various user interfaces 129 described herein with respect to FIGS. 4A-4F include various graphical user components such as buttons, fields, pick-lists, message windows, and other components. It is understood that such components presented herein are mere examples of the many different kinds of graphical components that may also be used to accomplish the same purposes. In addition, such components may be manipulated in any one of a number of ways. In one example, one may "click" on a component using a cursor controlled by a mouse. Although the following description may mention that a user may click on a component, it is understood that such an action is representative of the many different ways one may manipulate the various components presented.

With reference next to FIG. 4B, shown is one example of a user interface 129b that is generated on the display 126 (FIG. 1) of the respective client 103 by the location aware reminder application 133 in order to facilitate the generation or editing of a location based reminder 163. To this end, the user interface 129b facilitates the specification of various settings and other information in order to implement a location based reminder 163. The user interface 129b includes a reminder name field 203 that a user may manipulate in order to enter a new name for a new location based reminder 163 to be created, or to select a name of an existing location based reminder 163 to change settings or other data associated therewith. To this end, the reminder name field 203 may comprise a field for the entry of data, a pick list, or other type of graphical user component as can be appreciated.

The user interface 129b includes a map button 206 and a survey button 209. The map button 206 may be manipulated in order to generate a subsequent user interface 129 that depicts a map 153 (FIG. 2) upon which a user may define geographical triggers 156 (FIG. 2) as described above. Also, the survey button 209 may be manipulated to define geographical triggers 156 based upon a physical survey conducted by a user as will be described.

The user interface 129b includes a message window 213 in which a user may enter one or more messages associated with the current location based reminder 163. For each message that is entered in the message window 213, the user may manipulate the "add" button 216 to cause the message to be accepted. When a message is accepted, it is listed at the bottom of the user interface 129b as one of the reminder messages 219 associated with the current location based reminder 163 being configured. A "remove" button 223 is associated with each of the reminder messages 219 that may be manipulated by a user in order to remove or delete a given reminder message 219 with respect to the current location based reminder 163 if so desired.

Thus, a user may enter multiple messages for a given location based reminder 163 that are generated for a user when the user impinges on a given geographical trigger 156 as described above. In this sense, where multiple reminder messages 219 are involved, all of the reminder messages 219 may be depicted on a display 126 for a user at the same time or consecutively based on various inputs as can be appreciated.

Further, the user interface 129b includes time specification components 226 which allow a user to specify time ranges within which the location based reminder 163 is active. To this end, the operation of a location based reminder 163 (or other reminder) may be limited to specific times on specific days. Stated further, a location based reminder 163 or proximity based reminder 166, or any other type of reminder as described herein is "active" when there are no time constraints preventing it from being presented to a user. Thus, time constraints dictate the times when a location or proximity based reminder 163/166 is active.

For example, it may be the case that a respective location based reminder 163 is only active during a given hour of the day, and/or only during various specified days. Still further, the time specification components 226 include a calendar function so that one may identify both a time range and day or multiple days upon which the location based reminder 163 is active. For example, one may specify a trip line 156a (FIG. 2) that is linked to a given location based reminder 163 that is presented to a user each time the user passes over the trip line 156a. In addition, a user may specify a period of time that determines whether the location based reminder 163 is active at any given time. When inactive, a location based reminder 163 would not be presented to a user, for example, even though the client 103 passed over a trip line 156a associated therewith. To this end then, the time specification components 226 allow a user to specify time criteria in addition to the geographical triggers 156 that are associated with a given location based reminder 163.

Given the components in the user interface 129b, a user may thus provide the needed information in the various fields in order to define a given location based reminder 163 as described above with respect to the user interface 129b. Specifically, a user may enter a name for a new location based reminder 163 to be created, or the user may select the name of a previously existing location based reminder 163 so that the user may edit the same. In addition, the user interface 129b includes an "accept/done" button 233 that may be manipulated to cause the location aware reminder application 133 to store the settings and other data associated with the currently specified location based reminder 163 as can be appreciated.

Figure 4C:
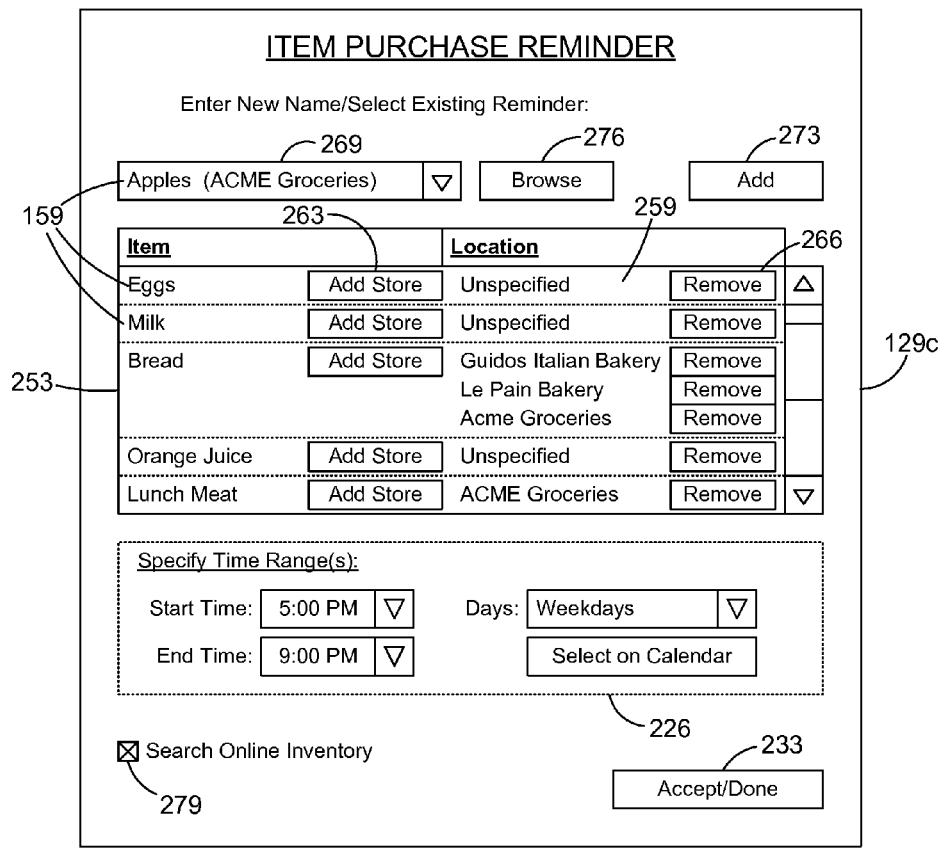

Referring next to FIG. 4C, shown is another user interface 129c that is employed to generate a specific type of location based reminder 163 that involves reminding a user to purchase an item 159 according to an embodiment of the present disclosure. The user interface 129c includes an item list 253 that lists items 159, for example, that a user may wish to purchase or that they need to replenish. Associated with each item 159 in the list 253 are source designations 259. The source designations 259 indicate, for example, various establishments 156c (FIG. 2) where the items 159 may be found and purchased.

Associated with each of the items 159 is an "add store" button 263. A user may click on an add store button 263 to specify establishments 156c as source designations 259 to be added to the item list 253 in association with a respective one of the items 159. To this end, multiple source designations 259 may be specified for each one of the items 159 as shown. A "remove" button 266 is provided so that a user may remove a given one of the source designations 259. Where there is only a single source designation 259 listed, then clicking on the remove button 266 causes the removal of the item 159 from the item list 253. In some cases, the source designation 259 may be "unspecified" meaning that no establishment 156c has been designated for such items 159.

The user interface 129c also includes an item name field 269 in which a user may specify an item 159 to be included in the item list 253. The user interface 129c also includes an "add" button 273 that may be manipulated in order to cause the listed item 159 in the item name field 269 to be added to the item list 253. The item name field 269 may allow a user to enter an item name for a new item 159 that has never been listed. Alternatively, the user may view a pick list from which to select an item 159 to be included in the item list 253, where such items 159 may have been listed in the past as would be the case with staple items 159 that are replenished periodically as can be appreciated. Listed next to the item names may be source designations 259 that were previously associated with such items 159. In addition, a browse button 276 is provided that links to other user interfaces 129 that facilitate the search for specific items 159 to be included in the item list 253. The item name entered may be a generic name or it may be brand specific.

The user interface 129c also includes the time specification components 226 to limit the generation of any location based reminders 163 relative to the items 159 in the item list 253 to specific times and/or specific days, etc. In addition, the user interface 129c includes a "search online inventory" toggle 279 that may be activated to indicate whether the location aware reminder application 133 should attempt to request a check of the inventory 145 (FIG. 1) of various establishments 156c that make their inventory 145 available via the network 109 (FIG. 1) in order to determine whether items 159 in the item list 253 are available at such establishments 156c as was mentioned above.

The items 159 in the item list 253 are generally items 159 that one wishes to purchase such as might be the case with a grocery list or other product list as can be appreciated. One may specify by virtue of the add store buttons 263 the source designations 259 where one wishes to purchase such items 159. It may be the case that a user may specify multiple stores that can be used for the purchase of a given item 159. As a consequence, whenever one finds themselves inside or near the establishments 156c comprising source designations 259 for items 159, one will be reminded to purchase such items 159 while there.

The user interface 129c further allows a user to specify items 159 in the item list 253 that the user may wish to purchase from specific source designations 259. By virtue of the fact that a user has specified various items 159 in the item list 253 along with the source designations 259, the location aware reminder application 133 is configured to generate location based reminders 163 (FIG. 3A) to purchase such items 159 only when a user is either located inside or near the specified source designation 259. However, where the source designations 259 are unspecified for a respective item 159, then the location aware reminder application 133 may be configured to check the inventory 145 through various servers 106a (FIG. 1) to determine whether such items 159 are available in various establishments 156c when a user is insider or near such establishments 156c.

Assume for example that a user has run out of eggs, milk, and bread at their home and needs to purchase more of such items 159. Assuming that such items 159 have been added to the item list 253, then the next time the user is either inside or near a source designation 259 that sells such items 159, a location based reminder 163 is generated on a display 126 of the client 103 to tell the user to purchase such items 159. As a consequence, the user will not forget such items 159, thereby avoiding wasted time and energy on a subsequent trip to the respective establishment 156c.

Given that the client 103 includes the positioning system 136 that generates the position of the client 103 at any given instant, and given that the client 103 further includes the map application 139 (FIG. 1) that includes the locations of the various establishments 156c, the location aware reminder application 133 can determine when a user is inside or near a given establishment 156c that can act as a source designation 259 for one or more items 159.

To this end, each of the establishments 156c such as stores or other establishments 156c indicated on a given map 153 may be considered as geographical triggers 156 that cause the generation of the location based reminders 163 to purchase such items 159 listed in the item list 253. In addition, by virtue of the time specification components 226, a user may limit the generation of such location based reminders 163 to predefined times on given days as can be appreciated. Once the user has completed entering items 159 into the item list 253, specifying source designations 259, or entering other information in the user interface 129c, the user may manipulate the accept/done button 233 to cause the current item list 253 and other settings to be stored and used by the location aware reminder application 133 to generate the location based reminders 163 as described above.

With reference to FIG. 4D, shown is a user interface 129d that facilitates the specification of the settings for a proximity based reminder 166 (FIG. 3B) according to various embodiments. The user interface 129d includes a name field 303 and an identifier field 306. The name field 303 facilitates the specification of a name of an individual for which the proximity based reminder 166 is to be created. According to one embodiment, one may enter a new name into the name field 303, or one may drop down previous names entered, where the settings for such names may be edited, etc.

The identifier field 306 facilitates the specification of an identifier associated with the client 103 (FIG. 1) of the person in the name field 303 for which the proximity based reminder 166 is generated. To this end, the identifier in the identifier field 306 may comprise, for example, a telephone number of a cellular telephone or other identifier that may be employed to communicate directly with such a device. Alternatively, a server that can identify the location of such device based upon the identifier. For example, where the identifier is a cell phone number, such may be used to communicate directly with such clients 103 through various protocols such as short message service (SMS) or other protocols. Alternatively, the location aware reminder application 133 in the client 103 may communicate with a device tracking application 147 (FIG. 1) in a server 106b (FIG. 1) that can provide the location information about the other client 103 as can be appreciated.

The user interface 129d also includes a map button 309 that may be manipulated to view a map 153 (FIG. 2) so that a user may identify an establishment 156c (FIG. 2) or define a geographical area 156b (FIG. 2) to be associated with the current proximity based reminder 166. To this end, if the user specifies a given establishment 156c or defines a geographical area 156b for the proximity based reminder 166, then the generation of the proximity based reminder 166 may be limited to those times when both clients 103 are located within the given establishment 156c or geographical area 156b. To this end, manipulating the map button 309 causes an additional user interface 129 that allows a user to select one or more establishments 156c or define one or more geographical areas 156b to be associated with the given proximity based reminder 166.

In addition, the user interface 129d includes a proximity field 313 according to various embodiments. The proximity field 313 allows a user to specify that the proximity based reminder 166 is to be generated whenever the two clients 103 are within a certain distance of each other. Such a distance may be specified in terms of any units including feet, yards, miles, or other distance as can be appreciated. It may be the case that the user specifies both establishments 156c and/or geographical areas 156b using the map button 309, and a distance in the proximity field 313 for the generation of a given proximity based reminder 166.

The user interface 129d also includes a message window 316 in which the one or more messages associated with a given proximity based reminder 166 may be entered. To this end, such a message may simply say that another individual is within a certain distance of the current client 103. Alternatively, the message may specify that the user is to perform a given task with respect to an individual who is close enough to do so such as pay back a debt owed or other task.

The user interface 129d further includes the time specification components 226 that may be employed to limit the generation of the proximity based reminder 166 to predefined times as was described above. Further, the user interface 129d includes an action specification component 319 in which one may specify that certain tasks are to be performed when it is detected that the respective clients 103 are within a relative proximity to each other as specified above. For example, where one of the individuals is under a restraining order from a court not to come within a certain distance of the user of a client 103, an electronic mail may be automatically sent to law enforcement agencies informing them of a violation of the restraining order when the distance between the respective clients 103 is too small.

The user interface 129d also includes the accept/done button 233 that informs the location aware reminder application 133 that all desired settings and other information has been entered with respect to the given proximity based reminder 166. In response, the location aware reminder application 133 takes steps to save such data and, thereafter, employs the data in generating the respective proximity based reminder 166 as can be appreciated.

Figure 4E:
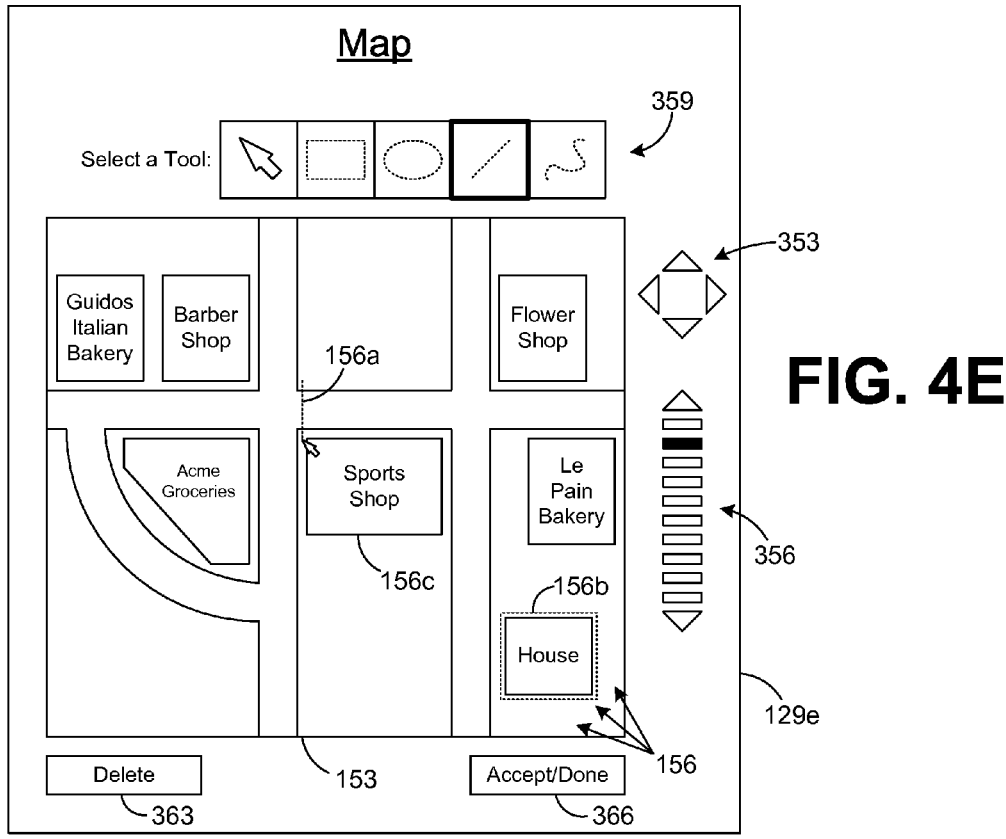

Referring next to FIG. 4E, shown is one example of a user interface 129e according to various embodiments. The user interface 129e presents a map 153 to facilitate the creation of the geographical triggers 156 as described above. To this end, the user interface 129e is generated based upon manipulation of the map button 206 (FIG. 4B), map button 309 (FIG. 4D), or the add store buttons 263 (FIG. 4C) to facilitate the specification of the various geographical triggers 156 as described above.

In particular, the user interface 129e includes a map 153 that may be generated based upon the operation of a map application 139 (FIG. 1) in the client 103. Alternatively, the map application 139 in the client 103 may interface with a map generation system on a server via the network 109 (FIG. 1) as can be appreciated. The user interface 129e includes map movement control components 353 and zoom control components 356 that may be employed to move around the map 153, and to zoom in or out of the present view as can be appreciated.

The user interface 129e further includes a number of marking tools 359 that facilitate the specification of a trip line 156a or a geographical area 156b. Further, one tool 359 comprises a cursor to click on an existing establishment 156c depicted in the map 153 to select the establishment 156c as a geographical trigger 156. When a trip line 156a or a geographical area 156b is created, they may be clicked upon thereafter to highlight the same. Once highlighted, such geographical triggers 156 may be deleted by manipulating the delete button 363.

Also, one may click on a given establishment 156c to highlight the establishment 156c. A subsequent click on a highlighted establishment 156c may cause the establishment 156c to be used as a geographical trigger 156 or some other action may accomplish the same result. An establishment 156c identified as a geographical trigger 156 may be indicated using a different color, etc. If it is decided at a later time that such establishment 156c is not to be used as a geographical trigger 156, then one may highlight the establishment 156c and click on the delete button 363. This will not cause the deletion of the establishment 156c from the map 153, but will remove the establishment 156c as a geographical trigger 156.

Once a user has specified each of the geographical triggers 156 on the map 153, the user may manipulate the accept/done button 366 which causes the location aware reminder application 133 to store such geographical triggers 156 in association with the current location based or proximity based reminder 163/166. Thereafter, the location aware reminder application 133 reverts back to the respective user interface 129b, 129c, or 129d as is appropriate.

Figure 4F:
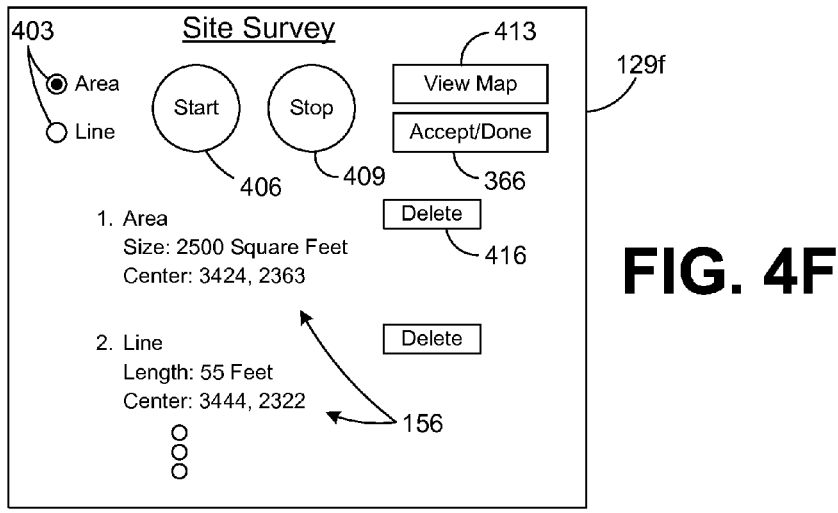

With reference next to FIG. 4F, shown is another example of a user interface 129f according to various embodiments. The user interface 129f facilitates the generation of geographical triggers 156 (FIG. 2) by virtue of a site survey. In particular, the user interface 129f facilitates the creation of a trip line 156a (FIG. 2) or a geographical area 156b (FIG. 2) by allowing an individual to walk the trip line 156a or along the perimeter of the geographical area 156b.

To begin, the user interface 129f includes toggle selectors 403 that may be manipulated to indicate whether the user wishes to create a trip line 156a or geographical area 156b. The user interface 129f also includes a start button 406 and a stop button 409. The start button 406 is manipulated when a user wishes to begin walking the trip line 156a or around the perimeter of a given geographical area 156b. The stop button 409 is manipulated when the user has completed walking the trip line 156a or around the perimeter of the geographical area 156b.

For example, if the user wishes to create a trip line 156*a*, the user would stand at a starting position comprising one end of the trip line 156*a* and click the start button 406. The user would then walk the trip line 156*a* until they came to the other end. When at the other end, the user would click the stop button 409. The clicking of the start and stop buttons 406/409 causes the location aware reminder application 133 to record the position data generated between the clicking of the start and stop buttons 406/409 so that the location aware reminder application 133 can ascertain the location of the geographical trigger 156 created. Stated another way, the clicking of the start/stop buttons 406/409 causes the location aware reminder application 133 to record the pathway traversed by the client 103. When generating a geographical area 156*b*, a user may not necessarily click the stop button 409 in the precise location where the user clicked the start button 406. In such case, the location aware reminder application 133 is configured to include any distance between the start and stop points as part of the perimeter of the geographical area 156*b* defined as can be appreciated.

The user interface 129*f* also includes a view map button 413 and an accept/done button 366. The view map button 413 causes the location aware reminder application 133 to generate a map 153 as described above with reference to FIG. 4E that depicts the trip line 156*a* or geographical area 156*b* just created by virtue of the site survey described above. The accept/done button 366 is manipulated in order to save the manually created geographical triggers 156 and return to the respective user interface 129*b*, 129*c*, or 129*d*, or other user interface 129 as is appropriate.

After the user has completed creating a given geographical trigger 156 by way of a site survey as described above, such geographical triggers 156 are listed at the bottom of the user interface 129*f* in terms of the size, length, relevant geographical coordinates, and/or other information. Also, for each geographical trigger 156, a graphical depiction thereof may be displayed on a small map.

Associated with each of the geographical triggers 156 is a delete button 416 that may be manipulated in order to eliminate a geographical trigger 156 from the list. When the user has completed generating the geographical triggers 156, the accept/done button 366 is manipulated in order to have such geographical triggers 156 stored with respect to the given reminder as described above.

It should also be noted that the user interfaces 129*a-f* described above are not the only user interfaces 129 that can be generated with respect to the operation of the location aware reminder application 133. Specifically, there are other user interfaces 129 that are presented for various purposes. However, such other user interfaces 129 are not described herein, where the user interfaces 129 that are described are presented to obtain an understanding of the various embodiments of the present disclosure.

Figure 5:
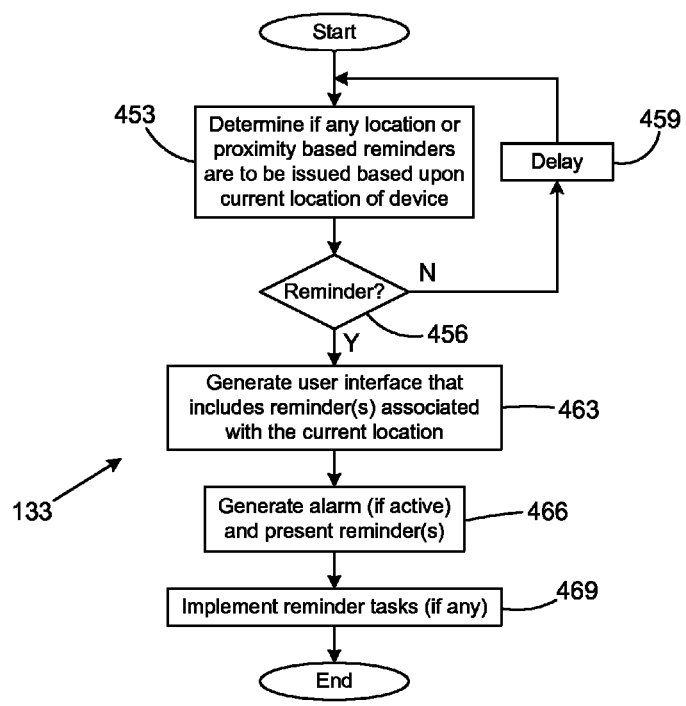
FIG. 5 is a flowchart that illustrates one example of a portion of the operation of an application in a client in the networked environment of FIG. 1 according to an embodiment of the present disclosure.

Referring next to FIG. 5, shown is a flowchart that provides one example of the operation of at least a portion of the location aware reminder application 133 according to an embodiment of the present disclosure. Alternatively, the flowchart of FIG. 5 may be viewed as depicting steps of an example of a method implemented in the clients 103 (FIG. 1).

Beginning with box 453, the location aware reminder application 133 determines if any location or proximity based reminders 163/166 (FIGS. 3A-3B) are to be issued based upon the current location of the respective client 103 and any other clients 103 (in the case of proximity based reminders 166). This may be determined, for example, if a given client 103 has impinged on a given geographical trigger 156 (FIG. 2) such as by passing over a trip line 156*a* (FIG. 2), or entering or leaving a given geographical area 156*b* (FIG. 2) or establishment 156*c* (FIG. 2). Alternatively, one may determine whether a given client 103 has come within a predefined distance of a geographical point 156*d* (FIG. 2).

Further, the location aware reminder application 133 may determine whether a proximity based reminder 166 is to be issued based upon whether a second client 103 is within a predefined distance of a given client 103. At the same time, the location aware reminder application 133 may verify whether the two clients 103 are within a given geographical area 156*b*, or establishment 156*c* as indicated for a specific proximity based reminder 166 if applicable, etc. Still other criteria or limitations may apply as described above, etc. For example, the location aware reminder application 133 determines whether any time limitations entered via the time specification components 226 (FIGS. 4B-4C) allow the generation of the given location or proximity based reminder 163/166.

In box 456, the location aware reminder application 133 determines whether a location or proximity based reminder 163/166 is to be issued. If not, then the location aware reminder application 133 reverts to box 459. Otherwise, the location aware reminder application 133 proceeds to box 463. In box 459, a delay is imposed before the location aware reminder application 133 reverts back to box 453 to detect whether any reminders 163/166 are to be issued given the new potential location of the client 103 or the new locations of other clients 103. Thereafter, the location aware reminder application 133 reverts back to box 453.

Assuming that a location or proximity based reminder 163/166 are to be generated in box 456, then in box 463 a user interface that includes the respective one or more location or proximity based reminders 163/166 associated with the current location of the device 103 and respective other devices 103 is generated to be rendered for a user on a display 126 or to be rendered in some other manner. Thereafter, in box 466, the reminder is presented on the display 126 and any alarms that are active may be executed such as an audible alarm, a vibration alarm, or other alarm as can be appreciated.

Thereafter, in box 469, any tasks that are to be implemented upon detection of a given location or proximity based reminder 163/166 are implemented such as, for example, emailing law enforcement officers as was described with respect to FIG. 4D above. Thereafter, the location aware reminder application 133 reverts back to box 453 to detect any new location or proximity based reminders 163/166 as described above.

In addition, there may be other operational portions of the location aware reminder application 133 not described herein in detail that involve functionality associated with the generation of the various user interfaces 129, the input and storage of settings associated with various reminders 163/166, and other functionality as can be appreciated.

Figure 6:
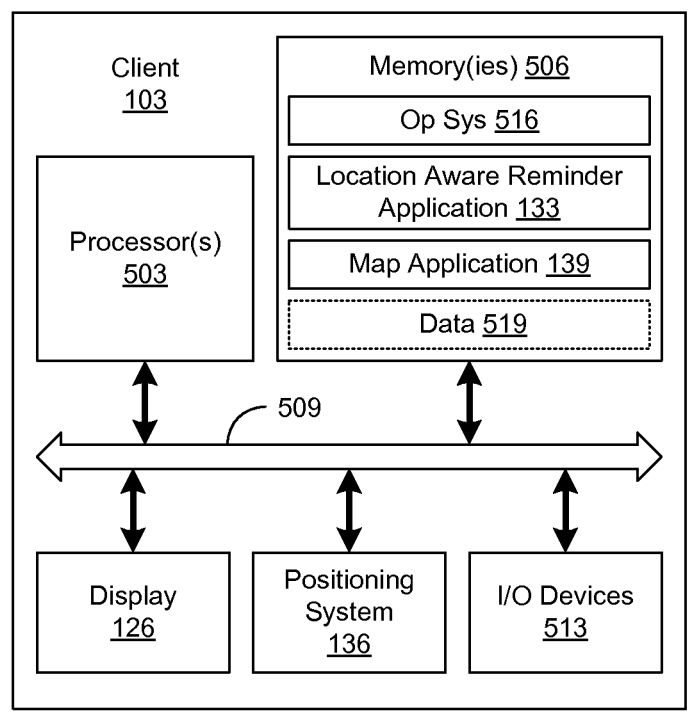
FIG. 6 is a schematic block diagram that depicts one example of a client in the networked environment of FIG. 1 according to an embodiment of the present disclosure.

Referring next to FIG. 6, shown is a schematic block diagram of one example of a client 103 according to an embodiment of the present disclosure. The client 103 includes a processor circuit, for example, having a processor 503 and a memory 506, both of which are coupled to a local interface 509. To this end, the client 103 may comprise, for example, a portable device such as laptop, personal digital assistant, cellular telephone, or other device. The local interface 509 may comprise, for example, a data bus with an accompanying address/control bus or other bus structure as can be appreciated. The client 103 includes the display 126 and the positioning system 136 that are both coupled to the local interface 509 to allow the processor 503 to apply visual data to the display 126 and to obtain position data from the positioning system 136. In addition, the client 103 includes various input/ output devices 513 such as push buttons, microphones, speakers, and other devices that are coupled to the local interface 509.

Stored in the memory 506 are several components that are executable by the processor 503. In particular, stored in the memory 506 are an operating system 516, the location aware reminder application 133, the map application 139, and other systems and applications. Also, various data 519 may be stored, for example, in the memory 506, or some other memory accessible to the client 103. It is understood that there may be other applications that are stored in the memory 506 and are executable by the processor 503 as can be appreciated. Where any component discussed herein is implemented in the form of software, any one of a number of programming languages such as, for example, C, C++, Java, Java Script, Perl, Python, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by a respective processor 503, source code that may be expressed in proper format such as object code that is capable of being loaded into a random access portion of the memory 506 and executed by a processor 503, or source code that may be interpreted by another executable program to generate instructions in a random access portion of the memory 506 to be executed by a processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 503 may represent multiple processors and the memory 506 may represent multiple memories that operate in parallel. In such a case, the local interface 509 may be an appropriate network that facilitates communication between any two of the multiple processors, between any processor and any one of the memories, or between any two of the memories etc. The local interface 509 may comprise additional systems designed to coordinate this communication, including, for example, performing load balancing. The processor 503 may be of electrical or of some other available construction.

Although various systems and applications such as the location aware reminder application 133 and/or other systems and applications mentioned above may be depicted as being embodied in software or code executed by general purpose hardware such as processor-based systems as discussed above, as an alternative the same may also be embodied in dedicated hardware or a combination of software/general purpose hardware and dedicated hardware. If embodied in dedicated hardware, such systems and applications can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 6 shows the architecture, functionality, and operation of an implementation of the location aware reminder application 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where various systems and applications described herein such as the location aware reminder application 133 and/or other systems and applications comprise software or code, each can be embodied in any computer-readable medium for use by or in connection with an instruction execution system such as, for example, a processor in a computer system or other system. In this sense, such systems or applications may comprise, for example, statements including instructions and declarations that can be fetched from the computer-readable medium and executed by the instruction execution system. In the context of the present disclosure, a "computer-readable medium" can be any medium that can contain, store, or maintain the above-described systems and applications for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, Universal Serial Bus (USB) flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    defining at least one geographical area in a device by generating a user interface rendered by the device, the user interface comprising a pathway traversed by the device during a predefined period of time, the user interface further facilitating definition of at least one geographical area associated with a merchant site;
    determining a geographical location of the device using a positioning system associated with the device;
    maintaining in the device a list of items;
    determining whether at least one of the items is available at the merchant site;
    detecting when the device impinges upon the at least one geographical area based upon the geographical location of the device by determining whether the device is located within the at least one geographical area; and
    generating a predefined reminder in the device associated with at least one of the items when a position of the device impinges upon the at least one geographical area associated with the merchant site.

2. A method, comprising:
    determining a geographical location of a mobile device with a positioning system associated with the mobile device;
    generating a user interface rendered by the mobile device, the user interface comprising a pathway traversed by the mobile device during a predefined period of time, the user interface further facilitating definition of at least one geographical trigger associated with a merchant site;
    maintaining a list accessible to the mobile device, the list comprising at least one item associated with at least one geographical trigger;
    detecting when the device impinges upon the at least one geographical trigger based at least in part upon the geographical location of the mobile device; and
    generating a predefined reminder in the mobile device when the mobile device impinges upon the geographical trigger.

3. The method of claim 2, wherein the at least one geographical trigger further comprises a trip line, and the step of detecting when the mobile device impinges upon the at least one geographical trigger further comprises the step of determining whether the mobile device has passed through the trip line.

4. The method of claim 2, wherein the at least one geographical trigger further comprises a geographical area, and the step of detecting when the mobile device impinges upon the at least one geographical trigger further comprises the step of determining whether the mobile device is located within the geographical area.

5. The method of claim 2, wherein the geographical trigger further comprises a geographical location, and the step of detecting when the mobile device impinges upon the at least one geographical trigger further comprises the step of determining whether the mobile device is within a predefined distance of the geographical location.

6. The method of claim 5, wherein the geographical location further comprises a geographical area.

7. The method of claim 2, further comprising the step of identifying the merchant site on a map rendered by the mobile device.

8. The method of claim 2, wherein the step of defining the at least one geographical trigger in the mobile device further comprises the steps of:
    displaying a map on the mobile device; and
    identifying the at least one geographical trigger on the map.

9. The method of claim 2, wherein the positioning system is configured to determine the geographic location of the mobile device based at least in part upon at least one of: global positioning system satellite signals or signals received from at least one cellular tower.

10. A system, comprising:
    a portable device having a processor circuit and a display screen, the processor circuit having a processor and a memory;
    a positioning system in the portable device configured to generate a geographical location of the portable device; and
    a location aware reminder application executable by the processor circuit, the location aware reminder application comprising:
    logic that maintains a list comprising at least one item;
    logic that detects when the portable device impinges upon the at least one geographical trigger based at least in part upon the geographical location of the portable device; and
    logic that generates a reminder associated with the at least one item in the portable device, the reminder rendered on the display screen when the portable device impinges upon the geographical trigger by generating a reminder on the portable device to purchase at least one of the items when a position of the portable device impinges upon the at least one geographical trigger comprising a predefined site, wherein the predefined site is a merchant site.

11. The system of claim 10, wherein the geographical trigger further comprises a trip line, wherein the logic that detects when the portable device impinges upon the at least one geographical trigger further comprises logic that determines whether the portable device has passed through the trip line.

12. The system of claim 10, wherein the geographical trigger further comprises a geographical area surrounding the merchant site, wherein the logic that detects when the portable device impinges upon the at least one geographical trigger further comprises logic that determines whether the portable device enters the geographical area.

13. The system of claim 10, wherein the geographical trigger further comprises a geographical location of the merchant site, wherein the logic that detects when the portable device impinges upon the at least one geographical trigger further comprises logic that determines whether the portable device is within a predefined distance of the geographical location.

14. The system of claim 10, wherein the location aware reminder application further comprises logic that generates a reminder on the portable device to purchase the at least one item when a position of the portable device impinges upon the at least one geographical trigger indicating at least a proximity to the merchant site.

15. The system of claim 10, wherein the location aware reminder further comprises logic that determines whether the at least one item is available for purchase from the merchant site.

16. The system of claim 10, wherein the positioning system is configured to determine the geographic location of the mobile device based at least in part upon at least one of: global positioning system satellite signals or signals received from at least one cellular tower.

17. A method, comprising:
determining in a first device a geographical location of the first device using a positioning system;
maintaining a position of a second device in the first device;
detecting when the first device is located in a predefined geographical relationship relative to the second device; and
rendering a reminder in the first device when the first device is located in the predefined geographical relationship relative to the second device, the reminder being associated with a user associated with the second device.

18. The method of claim 17, wherein the step of detecting when the first device is located in the predefined geographical relationship relative to the second device further comprises the step of determining whether the first device is within a predefined distance from the second device.

19. The method of claim 17, wherein the step of detecting when the first device is located in the predefined geographical relationship relative to the second device further comprises the step of determining whether the first device and the second device are located within a same establishment.

20. The method of claim 17, wherein the reminder indicates a task to be performed with respect to a user of the second device.

21. The method of claim 17, further comprising the step of performing a task in the first device when the first device is located in the predefined geographical relationship relative to the second device.

22. A method, comprising:
determining a geographical location of a first mobile device with a positioning system associated with the first mobile device;
generating a user interface rendered by the first mobile device, the user interface comprising a pathway traversed by the first mobile device during a predefined period of time, the user interface further facilitating definition of at least one geographical trigger associated with a merchant site;
maintaining a list accessible to the first mobile device, the list comprising at least one item associated with at least one geographical trigger;
detecting when the device impinges upon the at least one geographical trigger based at least in part upon the geographical location of the first mobile device;
detecting when the first mobile device is located in a predefined geographical relationship relative to a second mobile device; and
generating a predefined reminder in the first mobile device when the first mobile device impinges upon the geographical trigger, the geographical trigger comprising a predefined geographical relationship relative to the second mobile device.

23. A method, comprising the steps of:
maintaining, in a mobile device, a list comprising at least one item;
detecting, via the mobile device, when the mobile device impinges upon at least one geographical trigger based at least in part upon the geographical location of the mobile device; and
generating, via the mobile device, a reminder associated with the at least one item in the mobile device, the reminder rendered on the display screen when the mobile device impinges upon the geographical trigger by generating a reminder on the mobile device to purchase at least one of the items when a position of the mobile device impinges upon the at least one geographical trigger comprising a predefined site, wherein the predefined site is a merchant site.

24. The method of claim 23, wherein the geographical trigger further comprises a trip line, wherein the step of detecting when the portable device impinges upon the at least one geographical trigger further comprises the step of determining, via the portable device, whether the portable device has passed through the trip line.

25. The method of claim 23, wherein the geographical trigger further comprises a geographical area surrounding the merchant site, wherein the step of detecting when the portable device impinges upon the at least one geographical trigger further comprises the step of determining, via the portable device, whether the portable device enters the geographical area.

26. The method of claim 23, wherein the geographical trigger further comprises a geographical location of the merchant site, wherein the step of detecting when the portable device impinges upon the at least one geographical trigger further comprises the step of determining, via the portable device, whether the portable device is within a predefined distance of the geographical location.

27. The method of claim 23, further comprising the step of generating a reminder on the portable device to purchase the at least one item when a position of the portable device impinges upon the at least one geographical trigger indicating at least a proximity to the merchant site.

28. The method of claim 23, further comprising the step of determining whether the at least one item is available for purchase from the merchant site.

* * * * *

UNITED STATES PATENT AND TRADEMARK OFFICE
CERTIFICATE OF CORRECTION

| | | |
|---|---|---|
| PATENT NO. | : 8,416,073 B1 | Page 1 of 2 |
| APPLICATION NO. | : 13/282706 | |
| DATED | : April 9, 2013 | |
| INVENTOR(S) | : Christopher L. Scofield et al. | |

It is certified that error appears in the above-identified patent and that said Letters Patent is hereby corrected as shown below:

In the Claims

Column 16, line 6, before the word "geographical", insert the word --second--, to read as follows:
--further comprises a second geographical location--

Column 16, line 11, before the word "geographical", insert the word --second--, to read as follows:
--distance of the second geographical location--

Column 16, line 12, before the word "geographical", insert the word --second--, to read as follows:
--wherein the second geographical location--

Column 17, line 3, after the word "location", insert the words --of the merchant site--, to read as follows:
--location of the merchant site--

Column 17, line 7, before the word "position", delete "a" and insert --the--, to read as follows:
--item when the position of the portable device--

Column 17, line 16, before the word "device", delete "mobile" and insert --portable--, to read as follows:
--portable device based at least in part--

Column 17, line 41, before the word "user", delete "a" and insert --the--, to read as follows:
--with respect to the user of the--

Column 18, line 9, after the word "comprising", delete "a" and insert --the--, to read as follows:
--trigger comprising the--

Signed and Sealed this
Seventh Day of April, 2015

Michelle K. Lee
*Director of the United States Patent and Trademark Office*

CERTIFICATE OF CORRECTION (continued)
U.S. Pat. No. 8,416,073 B1

Column 18, line 13, before the word "device", delete "mobile" and insert --portable--, to read as follows:
--in a portable device--

Column 18, line 16, before the first occurrence of the word "device", and before the second occurrence of the word "device", delete "mobile" and insert --portable--, to read as follows:
--via the portable device, when the portable device--

Column 18, line 18, delete the last word on the line "mobile", and insert --portable--, to read as follows:
--location of the portable--

Column 18, line 20, before the word "device", delete "mobile" and insert --portable--, to read as follows:
--via the portable device--

Column 18, line 21, before the word "device", delete "mobile" and insert --portable--, to read as follows:
--one item in the portable device--

Column 18, line 23, before the word "device", delete "mobile" and insert --portable--, to read as follows:
--portable device impinges upon--

Column 18, line 24, before the word "device", delete "mobile" and insert --portable--, to read as follows:
--reminder on the portable device--

Column 18, line 26, before the word "device", delete "mobile" and insert --portable--, to read as follows:
--portable device impinges upon--

Column 18, line 48, after the word "location", insert the words --of the merchant site--, to read:
--geographical location of the merchant site.--

Column 18, line 51, before the word "position", delete "a" and insert --the--, to read:
--one item when the position--